United States Patent

Bennigsen

[15] 3,653,674

[45] Apr. 4, 1972

[54] JACKETED GASKET

[72] Inventor: Gerd Von Bennigsen, Geisenbrunn Post Gilching, Germany

[73] Assignee: Reinz Dichtungs-Gesellschaft m.b.H., Neu-Ulm Donau, Germany

[22] Filed: Dec. 21, 1970

[21] Appl. No.: 99,851

Related U.S. Application Data

[62] Division of Ser. No. 671,442, Sept. 28, 1967, Pat. No. 3,549,157.

[30] Foreign Application Priority Data

Sept. 13, 1966 Germany.................................R 44250

[52] U.S. Cl..............................277/231, 277/233, 277/235
[51] Int. Cl...........................................................F16j 15/02
[58] Field of Search.................277/229, 230, 231, 232, 233, 277/234, 235; 29/512, 522; 72/82, 125; 92/169, 172

[56] References Cited

UNITED STATES PATENTS 3,336,659  8/1967  Staples et al..............................29/512

Primary Examiner—Houston S. Bell, Jr.
Attorney—Erich M. H. Radde and Gerard J. Weiser

[57] ABSTRACT

Jacketed gasket with at least one of its legs folded over for at the most half of its width, the fold being at a distance from the bend of the jacket which is at least equal to the thickness of the gasket in the non-compressed state.

Inserts, such as annular disks, washers, wires of metal and synthetic resin, or other plastic material may be inserted into the fold.

The gasket, after compression of its jacketed part has the advantage that no flowing out or squeezing out of the gasket material on compression or tightening of the gasket between the surfaces to be sealed can take place. Thus satisfactory sealing is guaranteed.

18 Claims, 10 Drawing Figures

JACKETED GASKET

CROSS-REFERENCE TO RELATED APPLICATION

This application is a division of copending application Ser. No. 671,442, filed Sept. 28, 1967 and entitled "JACKETED GASKET", now U.S. Pat. No. 3,549,157.

BACKGROUND OF THE INVENTION

1 Field of the Invention

The present invention relates to gaskets and more particularly to partly enclosed or edge jacketed gaskets, i.e., to gaskets of a relatively soft material the edge parts of which are provided with and embraced by a reinforcing jacket.

2 Description of the Prior Art

Sealing or packing sheets or gaskets consisting of a relatively soft material such as asbestos, preferably compressed asbestos, with natural or synthetic rubber as binder are jacketed and reinforced with jackets or borders preferably of sheet metal, especially at the edges which are exposed to considerable wear and tear. The jackets or borders increase the mechanical strength of such sheet gaskets and protect them against destructive and injurious effects.

Such borders or edge jackets are especially useful for packing sheets or gaskets consisting of plastic material or asbestos in mixtures with suitable binders when serving for packing and sealing separating or parting joints or gaps. In such instances the borders or jackets exert not only a protective effect but they also improve local compressibility which can be adjusted within a wide range by varying the thickness of the bordering or jacketing sheet metal and the width of the jacket or border.

When exposed to higher temperature, sheet gaskets or sealing and packing sheets composed, for instance, of asbestos and a binder, for instance, a synthetic resin, natural or synthetic rubber, and the like have the tendency to flow and to be squeezed out of the border or jacket area due to the high compression pressure. As a result thereof the material forming the jacketed sheet gasket, for instance, plastic or the asbestos mixture is squeezed out and flows out of the jacket. Due thereto the pressure on compressing the jacket and gasket is reduced to such an extent that proper sealing of the joint, for instance, against gases cannot be achieved with certainty.

Many attempts have been made to overcome these and other disadvantages such as the flowing out of the sealing and packing material of the packing and/or destruction of the gasket or packing sheet. But they did not yet meet with success.

SUMMARY OF THE INVENTION

It is one object of the present invention to provide a gasket or packing sheet which is free of the disadvantages of the heretofore known gaskets or packing sheets and which has a number of additional advantages.

Other objects of the present invention and advantageous features thereof will become apparent as the description proceeds.

In principle the gasket according to the present invention is characterized by having at least one leg or extension of the border or jacket folded over and thus doubling the thickness of the jacket. However, the folded over part of the leg should cover the remaining part of the leg only for a relatively small distance, i.e., not more than for about one half, and preferably for about one third to one fourth of the width of the leg thus leaving part of said leg uncovered by the folded portion of the leg. Folding is effected at a distance from the bend of the jacket which is at least equal to the thickness of the gasket in the non-compressed state.

The leg or extension of the border or jacket on the opposite side of the gasket may be folded over in the same manner and at the same distance from the bend of the jacket to the front edge of the folded part of the other leg or, respectively, to its rear edge or therebetween. Preferably the unfolded leg on the opposite side of the gasket extends to about the middle or center line of said folded part of the other leg. In this manner squeezing out or flowing out of the gasket material within the area of the bordering or jacketing sheet metal is completely prevented or at least kept in permissible limits.

Regardless whether the sheet metal border or jacket is folded on both sides or only on one side of the gasket, the effect is achieved that the clamping or compressing pressure causes upsetting compression or, respectively, pinching or squeezing together of the gasket material so that it cannot run out of the jacket. As a result thereof an undesired detrimental decrease in clamping or compression pressure is avoided.

The material used for bordering or jacketing the gasket may be any conventionally used bordering sheet metal, such as iron or soft sheet, stainless steel, Monel metal, aluminum, copper, zinc, nickel, lead, and others. It may also be plastic material such as polytetrafluoro ethylene. Especially suitable have proved deep-drawing sheet metal or, respectively, rigid, non-deforming synthetic resin, the shape of which is not affected by increased temperature.

Suitable resilient and relatively soft gasket materials are, for instance, asbestos which may be compressed and/or impregnated with suitable binder material such as natural or synthetic rubber, synthetic resins, and the like materials. Said binders may contain conventional filler materials. The gasket material may be reinforced, for instance, by a preferably perforated sheet metal insert, a wire web, a web of wires and asbestos filaments, and the like. All such known soft and resilient packing or gasket materials, even if as such not yielding and not having the tendency to flow, do become plastic or do yield under the clamping or compression pressure and at increased temperature so that they flow out or are squeezed out of the jacketed or bordered area of the gasket or that they yield and thus decrease the packing and sealing effect. Such flowing and yielding is prevented, at least to a large extent, by the present invention.

The jacketing or bordering sheet metal or plastic may be folded or laid over, outwardly or inwardly.

According to an advantageous embodiment of the present invention inserts may be provided and inserted into the fold or, respectively, into one of the folds or in both folds, if present. Said inserts are composed of non-compressible material, if it is desired to increase the clamping or compression pressure upon the jacketed part of the gasket. They may also consist of a flowable material, for instance, of a flowable synthetic resin, if additional micro-sealing is required. The inserts may also have the form of disks or flanges, of rings, of wires and the like and may consist, for instance, of metal or of synthetic resin. The inserts permit additional variations in the distribution of the clamping or compression pressure exerted on the jacketed part of the gasket. If such inserts are of plastic material, they cause better filling out and, as a result thereof, better sealing of the tool marks and grooves caused by machining and tooling the jacketing sheet metal. At the same time they increase the clamping pressure.

BRIEF DESCRIPTION OF THE DRAWINGS

The attached drawings illustrate various embodiments of the present invention. In said drawings

DESCRIPTION OF THE PREFERRED EMBODIMENTS

Figure 1:
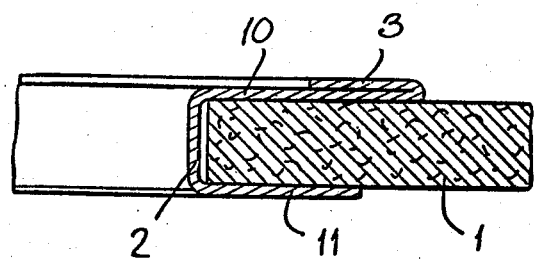
FIGS. 1 and 2 are cross-sectional views of the edge part of gaskets according to the present invention having only one leg of the jacket folded over.

In FIG. 1 there is shown gasket 1 consisting of compressed asbestos with binder. Said gasket is jacketed at its edge by deep-drawing sheet iron enclosing and reinforcing the edge portion of the gasket on both its upper and its lower surface. Upper extension or leg 10 of jacket 2 is folded over outwardly and forms outward fold 3. As is evident, said outward fold 3 is about half as wide as upper leg or flange 10 of jacket 2. It ends at a distance from the bend of jacket 2 corresponding to about the thickness of gasket 1. Lower leg or flange 11 of jacket 2 ends at a distance about half the width of upper fold 3.

Figure 2:
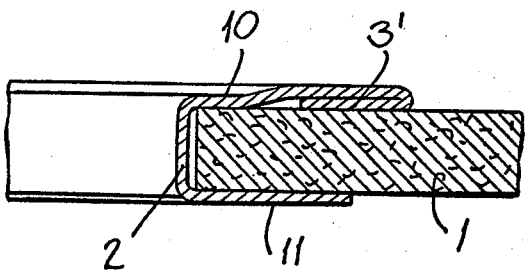

FIG. 2 shows the same jacketed gasket 1 whereby folded part 3' of upper leg 10 is folded inwardly.

Figure 3:
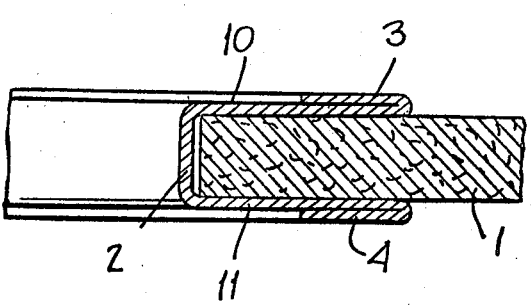
FIGS. 3 and 4 are cross-sectional views of gaskets having both legs folded over.

In FIG. 3 extensions or legs 10 and 11 of jacket 2 are folded over outwardly on both sides of gasket 1. Folds 3 and 4 have a width corresponding to about the thickness of gasket 1 and end at a distance from the points at which jacket 2 is bent around gasket 1 corresponding to about the thickness of gasket 1.

Figure 4:
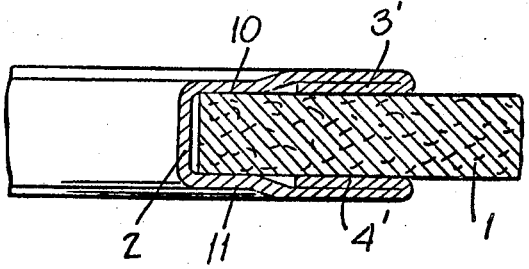

FIG. 4 shows the same jacketed gasket 1 whereby folded parts 3' and 4' at the upper and lower surface of said gasket 1 are folded inwardly. In FIGS. 3 and 4 the distance of folds 3 and 4 or, respectively, 3' and 4' from the points at which jacket 2 is bent around gasket 1 is about the same.

Figure 5:
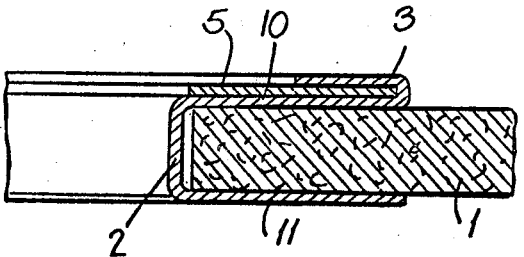
FIGS. 5 to 8 are cross-sectional views of jacketed gaskets with inserts into the folded part or parts of the jacket.

FIG. 5 shows a jacketed gasket in which annular disk or spacing washer 5 is inserted into the fold between leg 10 and folded part 3. Said annular disk is not as wide as gasket 1 and ends before the point at which jacket 2 is bent around said gasket 1. Lower leg 11 of jacket 2 extends as far as the fold of upper leg 10 but is not folded.

Figure 6:
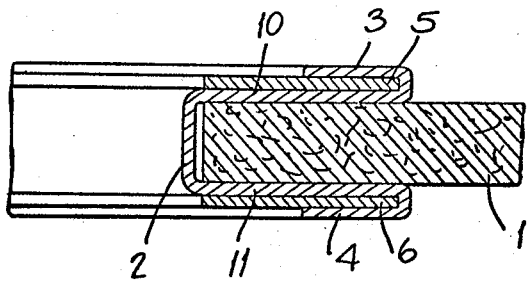

FIG. 6 shows a similar embodiment of the present invention as illustrated in FIG. 5 whereby both legs 10 and 11 of jacket 2 are folded to form folds 3 and 4 and whereby annular disks 5 and 6 are inserted into the folds.

Figure 7:
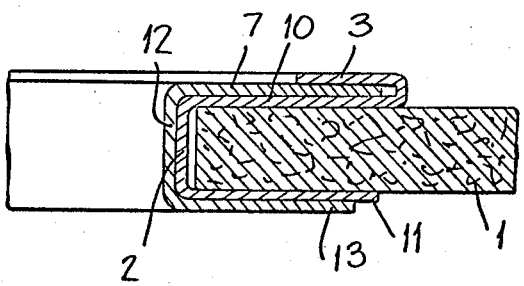

FIG. 7 illustrates an embodiment of this invention wherein not only jacket or bordering flange 2 is bent around gasket 1 but also insert 12 which is inserted with its leg 7 between upper leg 10 and folded part 3 of jacket 2 and is bent outwardly of and around jacket 2 with its lower leg 13 covering leg 11 thereof.

Figure 8:
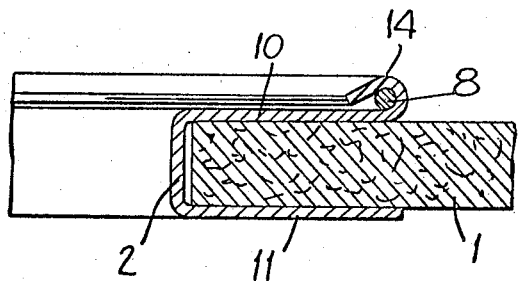

In FIG. 8 upper leg 10 of jacket 2 is bent around wire insert 8 and forms loop 14.

Figure 9:
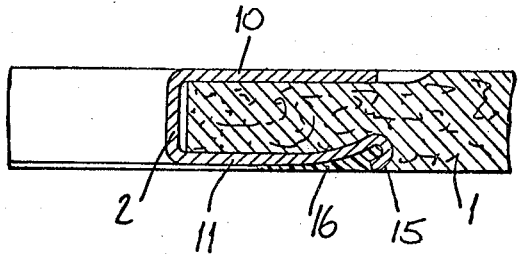
FIGS. 9 and 10 are cross-sectional views of folded jackets having inserts of plastic material. In said drawings like index numerals indicate like parts of the jacketed gaskets.

FIG. 9 shows gasket 1 after compression with lower folded loop 15 extending from lower leg 11 of jacket 2. Upper leg 10 is not folded. Compressible plastic material 9 is inserted in loop 15. It is partly squeezed out therefrom on compression and thus covers and seals the turning grooves or tool marks which might be present in lower leg 10.

Figure 10:
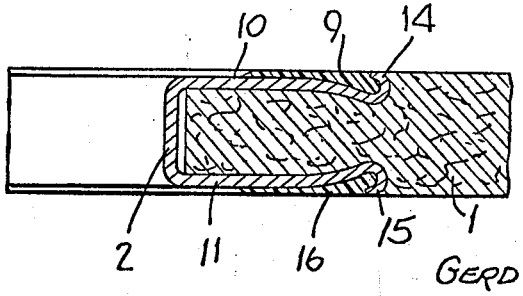

FIG. 10 shows a gasket 1 in which loops 14 and 15 are provided on upper and lower legs 10 and 11 of jacket 2. Said loops are filled up with plastic inserts 9 and 16 which are partly squeezed out on compressing the finished edge-jacketed gasket.

In place of compressed asbestos there may be employed other gasket materials with or without binder, such as white asbestos millboard, woven asbestos fabric, white asbestos fabric with copper or brass wire reinforcing inserts. Leather, flax or jute, cotton fabric, wool in the form of felt, cork, paper, polytetrafluoro ethylene, polyethylene, and other gasket materials may also be used.

In place of deep-drawing sheet iron, there may be used other metals for edge-jacketing or bordering the gasket such as aluminum, copper, soft steel, Monel metal, lead, zinc, nickel and others or synthetic resins such as polytetrafluoro ethylene and others.

The binder material may be natural or synthetic rubber, neoprene, butyl rubber, chlorinated rubber, polyvinylchloride, and others.

Gaskets according to the present invention have proved to be especially suitable as cylinder head gaskets. They may, of course, also be used for other packing and sealing purposes, for instance, for boiler handholes and manholes, reaction vessels, column stills, and in general for any inclusion between rigid parts of a fluid container in essentially stationary relationship to prevent or stop leakage.

I claim:

1. A jacketed gasket comprising a gasket of compressible material having an exposed edge and a jacket of substantially non-compressible material and folded around said exposed edge and jacketing the adjacent edge portion of said compressible material gasket, said jacket having a bottom leg underlying said gasket material and a top leg overlying said gasket material, the free end of at least one of said legs being reverse folded back into juxtaposition with the unfolded portion thereof to define a double thickness jacket area, the line of said back fold being a distance from the edge-covering bend of said jacket which distance is at least equal to the thickness of said gasket material in its non-compressed state, the reverse folded portion of said leg covering no more than one half of the length of the unfolded portion thereof, said jacketed gasket further comprising an insert inserted between said reverse folded portion and said unfolded portion of the jacket.

2. The jacketed gasket of claim 1, wherein a metal wire is inserted between said reverse folded portion and said unfolded portion.

3. The jacketed gasket of claim 1, wherein the insert is a plastic material. occur 1, 4. The jacketed gasket of claim 1, wherein the insert is a synthetic resin material.

5. The jacketed gasket of claim 1, wherein the insert is an annular disk.

6. The jacketed gasket of claim 1, wherein the insert is an annular disk of a synthetic resin.

7. The jacketed gasket of claim 1 with the free end of only one of said legs reverse folded and with the other leg unfolded, an insert being inserted between said reverse folded portion and said unfolded portion, said insert having a free end bent around said edge and under said other leg 8. The jacketed gasket of claim 7, wherein the insert is a plastic material.

9. The jacketed gasket of claim 7, wherein the insert is a synthetic resin material.

10. The jacketed gasket of claim 7, wherein the insert is an annular disk

11. The jacketed gasket of claim 7, wherein the insert is an annular disk of a synthetic resin.

12. The jacketed gasket of claim 1, in which the free end of said one leg is reverse folded outwardly.

13. The jacketed gasket of claim 1, in which the free end of said one leg is reverse folded inwardly.

14. The jacketed gasket of claim 1, wherein said compressible material is asbestos.

15. The jacketed gasket of claim 1, wherein said compressible material is asbestos having a binder material incorporated therein.

16. The jacketed gasket of claim 1, wherein said compressible material is reinforced asbestos.

17. The jacketed gasket of claim 1, wherein said jacket is formed from sheet metal.

18. The jacketed gasket of claim 1, wherein said jacket is formed from a rigid plastic material capable of retaining its shape when subjected to an increase in temperature.

* * * * *